United States Patent
Bihari et al.

(10) Patent No.: US 11,381,127 B2
(45) Date of Patent: Jul. 5, 2022

(54) STATOR STRUCTURE WITH TWO LAYERS OF PRE-WOUND COILS

(71) Applicant: DANA TM4 INC., Boucherville (CA)

(72) Inventors: Gyula Bihari, Brossard (CA); Ruisheng Shi, Montreal (CA); Mohammad Adib Ghadamyari, Longueuil (CA)

(73) Assignee: DANA TM4 INC., Boucherville (CA)

( * ) Notice: Subject to any disclaimer, the term of this patent is extended or adjusted under 35 U.S.C. 154(b) by 213 days.

(21) Appl. No.: 16/954,493

(22) PCT Filed: Dec. 17, 2018

(86) PCT No.: PCT/CA2018/051611
§ 371 (c)(1),
(2) Date: Jun. 16, 2020

(87) PCT Pub. No.: WO2019/119120
PCT Pub. Date: Jun. 27, 2019

(65) Prior Publication Data
US 2021/0167653 A1 Jun. 3, 2021

Related U.S. Application Data

(60) Provisional application No. 62/599,929, filed on Dec. 18, 2017.

(51) Int. Cl.
*H02K 3/28* (2006.01)
*H02K 1/16* (2006.01)
*H02K 3/12* (2006.01)
*H02K 15/06* (2006.01)

(52) U.S. Cl.
CPC ............... *H02K 3/28* (2013.01); *H02K 1/16* (2013.01); *H02K 3/12* (2013.01); *H02K 15/065* (2013.01)

(58) Field of Classification Search
CPC .. H02K 3/28; H02K 1/16; H02K 3/12; H02K 15/065
See application file for complete search history.

(56) References Cited

U.S. PATENT DOCUMENTS

| | | |
|---|---|---|
| 6,894,417 B2 | 5/2005 | Cai et al. |
| 6,940,202 B1 | 9/2005 | Chen et al. |
| 10,529,463 B2 * | 1/2020 | Yamoto ................... H01B 3/30 |
| 2006/0145558 A1 * | 7/2006 | Kashihara ................ H02K 3/38 310/201 |
| 2009/0200888 A1 | 8/2009 | Tanaka et al. |
| 2021/0167653 A1 * | 6/2021 | Bihari ...................... H02K 3/28 |

OTHER PUBLICATIONS

ISA Canadian Intellectual Property Office, International Search Report and Written Opinion Issued in Application No. PCT/CA2018/051611, dated Feb. 19, 2019, WIPO, 9 pages.

* cited by examiner

*Primary Examiner* — Robert W Horn
(74) *Attorney, Agent, or Firm* — McCoy Russell LLP

(57) ABSTRACT

An electric machine provided with a stator structure including internal and external layers of interleaved pre-wound coils made of rectangular wire coated with enamel insulation varnish is described herein. The two layers of pre-wound coils allow the use of slightly different size of pre-wound coils, which facilitates their insertion into the stator slots.

11 Claims, 3 Drawing Sheets

STATOR STRUCTURE WITH TWO LAYERS OF PRE-WOUND COILS

CROSS-REFERENCE TO RELATED APPLICATIONS

The present application is a U.S. National Phase of International Application No. PCT/CA2018/051611, entitled "STATOR STRUCTURE WITH TWO LAYERS OF PRE-WOUND COILS", and filed on Dec. 17, 2018. International Application No. PCT/CA2018/051611 claims priority to U.S. Provisional Patent Application Nos. 62/599,929 filed Dec. 18, 2017, under the title STATOR STRUCTURE WITH TWO LAYERS OF PRE-WOUND COILS. The content of the foregoing patent applications are hereby expressly incorporated by reference into the detailed description hereof.

FIELD OF INVENTION

The present disclosure relates to stator structures for electric machines. More specifically, the present disclosure is concerned with a stator structure provided with two or more layers of pre-wound coils.

BACKGROUND

Stator structures using pre-wound coils made of rectangular wire are known in the art. It has been found that when the diameter of the stator is relatively small, the insertion of the pre-wound coils is more difficult and may become impossible to do while keeping intact the coat of insulation varnish provided on the rectangular wire forming the pre-wound coils. Further, particularly in that case of smaller stators, the user of a single pre-wound coil having a single wire can result in a large coil overhang at the ends of the stator, which is not cost efficient and can increases stator weight unnecessarily.

SUMMARY

According to one example aspect, is a multi-phase electric machine comprising a rotor and a stator structure, the stator structure including a generally cylindrical body including teeth defining coil-receiving slots; an internal and an external layer of interleaved electrically conducting coils inserted into the slots with the internal and the external layers separated by an insulating layer. Each phase includes coils provided on the internal layer of interleaved coils and coils provided on the external layer of interleaved coils.

According to another example is a method of inserting pre-wound coils into coil-receiving slots defined by radially extending teeth on the surface of a stator of a multi-phase machine, the method comprising: inserting interleaved electrically conducting coils into the slots to form an internal layer of interleaved coils; inserting interleaved electrically conducting coils into the slots to form an external layer of interleaved coils; and forming a plurality of winding phases, each winding phase including coils provided on each of the internal and the external layers of interleaved coils.

DETAILED DESCRIPTION

Figure 1:
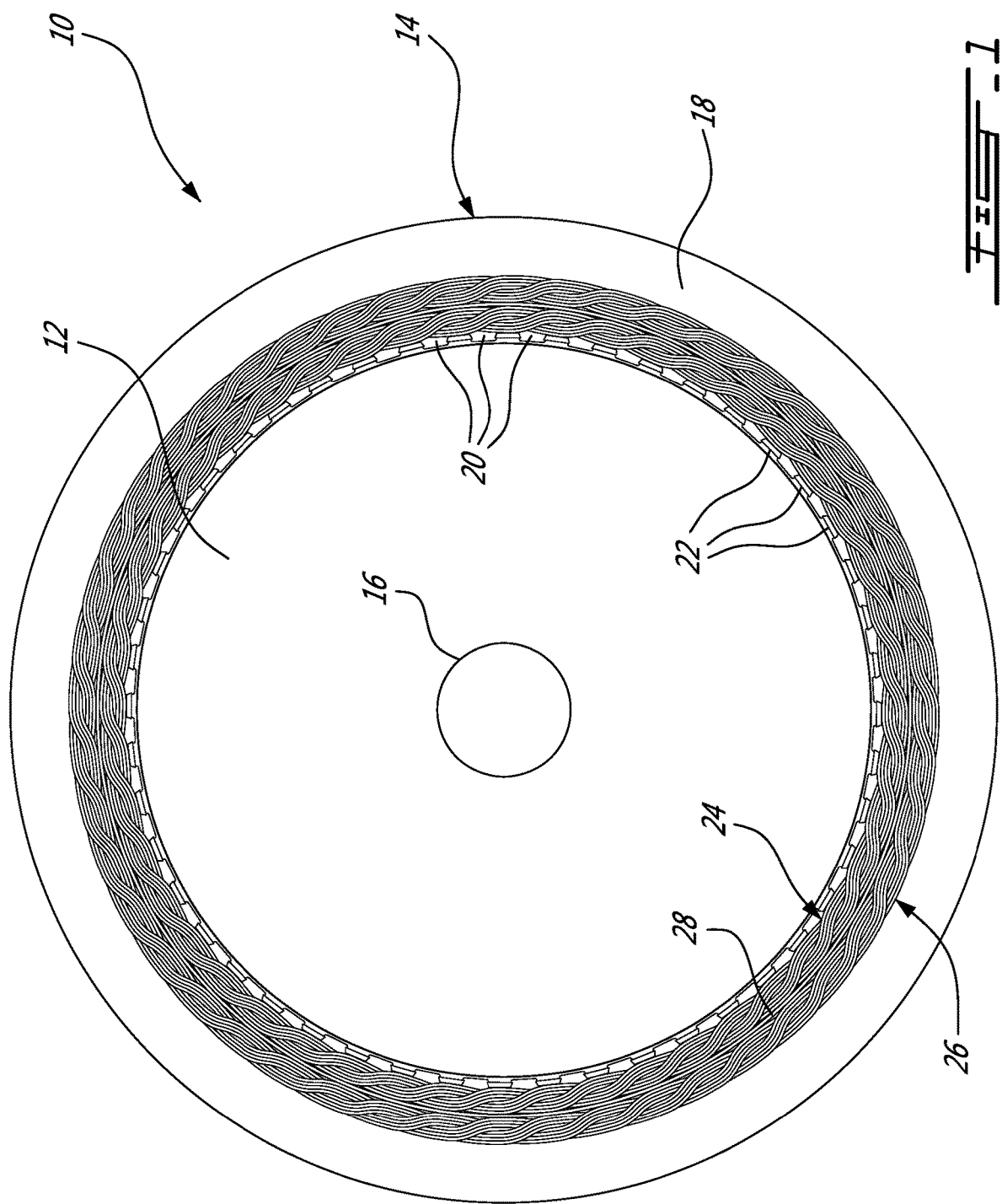
FIG. 1 is a front schematic view of an electric machine provided with a stator structure in accordance with one example embodiment of the present disclosure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

Further, in this specification, the terms "axial direction", "axially", "axial", and the like, refer to the direction of the rotation axis of the rotor, the direction of the central axis of the cylindrical stator, and the directions corresponding to them, the terms "radial direction", "radially", "radial", and the like, refer to the directions perpendicular to such axial directions, and the terms "circumferential direction", "circumferentially", "circumferential", and the like, refer to each direction along the circumference of a circle drawn about a given point of the rotation axis on a plane perpendicular to the rotation axis.

The expression "connected" should be construed herein and in the appended claims broadly so as to include any cooperative or passive association between mechanical parts or components. For example, such parts may be assembled together by direct coupling, or indirectly coupled using further parts. The coupling can also be remote, using for example a magnetic field or else.

Other objects, advantages and features of the stator structure with two layers of pre-wound coils will become more apparent upon reading of the following non-restrictive description of illustrative embodiments thereof, given by way of example only with reference to the accompanying drawings.

Generally stated, a stator structure with two layers of pre-wound electrically conducting coils according to an illustrative embodiment includes internal and external layers of interleaved pre-wound coils made of rectangular wire coated with enamel insulation varnish. The two layers allow the use of slightly different sizes, therefore having different electrical resistance, of pre-wound coils having fewer turns, which better facilitates their insertion into the stator slots. In some example embodiments, more than two layers of interleaved pre-wound coils may be used.

Turning now to FIG. 1 of the appended drawings, an electric machine 10 including an internal rotor 12 and an external stator 14 will be described. The electric machine 10 is shown herein in a schematic form.

The internal rotor 12 includes a longitudinal shaft 16. The technology used for the internal rotor 12 is not relevant to the stator structure described herein and therefore will not be described in greater details.

As can be seen from FIG. 1, the external stator 14 includes a stack of laminations 18, defining a generally cylindrical stator body, having internal teeth 20 that define internal coil receiving slots 22.

The pre-wound coils used in the external stator of FIG. 1 are interleaved rectangular wire pre-wound coils. These coils are separated into two layers of coils, internal coils 24 and external coils 26. The internal and external coils are separated by an electrically insulating paper layer 28.

The machine illustrated in FIG. 1 is a three-phase machine where the coils of each phase occupies two consecutive slots every six slots.

Since the distance separating the rotor 12 and the internal coils 24 is smaller than the distance separating the rotor 12 and the external coils 26, the voltage present in the internal coils 24 will be different than the voltage present in the external coils 26. Accordingly in one example embodiment of the disclosure, to ensure a proper averaged voltage, half of the coils for each phase may be present on the internal layer of coils and the other half of the coils may be located on the external layer of coils.

Figure 2:
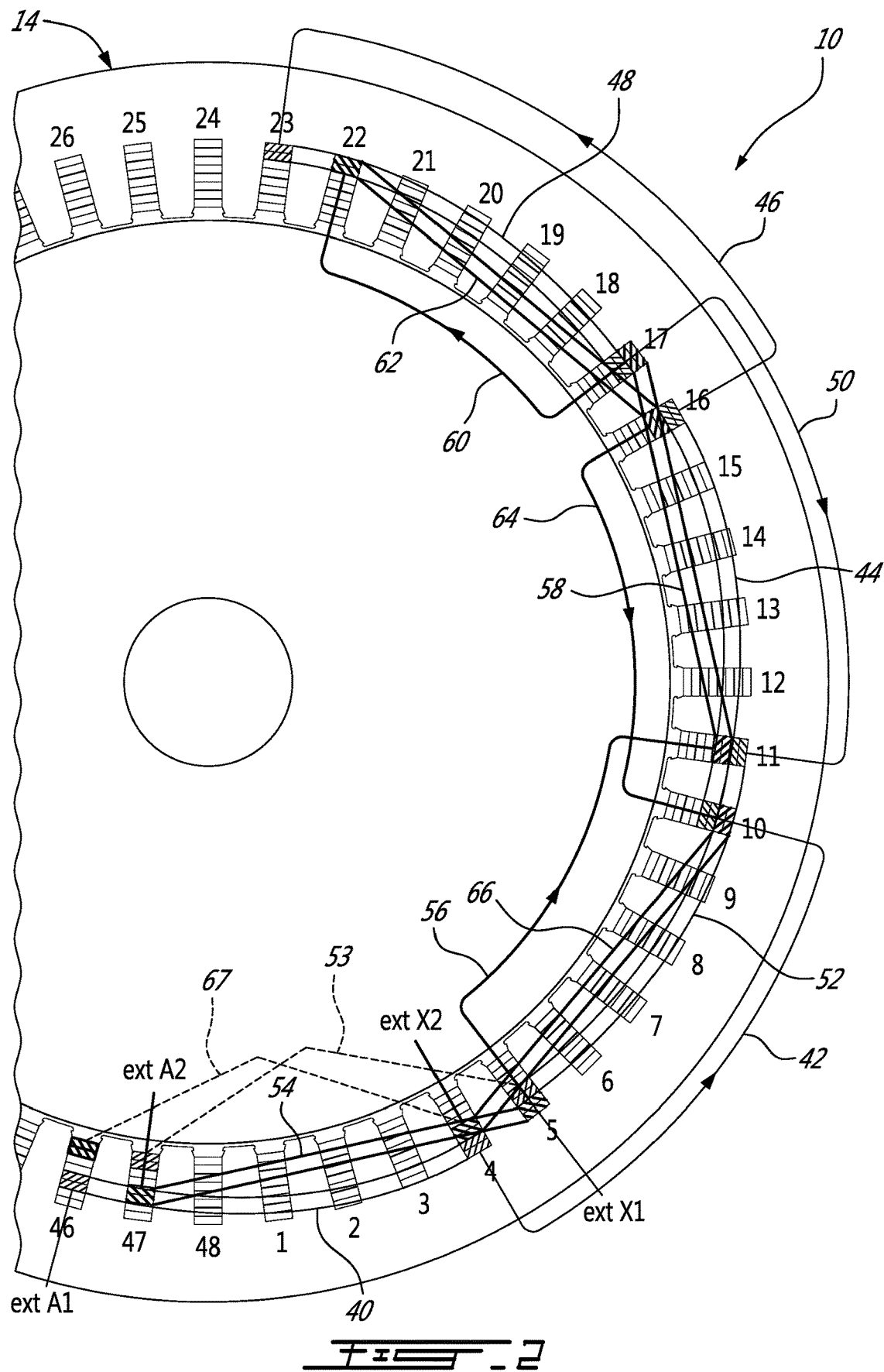
FIG. 2 is a schematic sectional view of the stator structure of FIG. 1.

Turning now to FIG. 2 of the appended drawings, the positioning of the coils of phase A for half of the stator 14 will be described. Indeed, for concision and clarity reasons, only phase A is illustrated in FIG. 2 and described hereinbelow. It is to be noted that in FIG. 2, the heads of the coils are shown as circle arcs to simplify the drawing. Similarly, the leads interconnecting the coils are shown schematically.

Each coil described hereinbelow may be made of two turns of rectangular wire and generally spans five (5) slots between longitudinal arms.

As mentioned hereinabove, phase A occupies two consecutive slots every six slots. Therefore two windings are made.

The first exterior winding starts with a first coil 40 having a first lead defining the first entry point labeled «ext A1». The first coil 40 goes from slot 46 to slot 4. The second lead 42 of the first coil 40 spans from slot 4 to slot 10 where it interconnects with the first lead of a second coil 44.

The second coil 44 goes from slot 10 to slot 16. The second lead 46 of the second coil 44 spans from slot 16 to slot 23 where it interconnects with the first lead of a third coil 48.

The third coil 48 starts the return of the first winding of phase A since the halfway point of the stator 14 has been reached. Accordingly, the third coil goes from slot 23 back to slot 17. The second lead 50 of the third coil 48 spans from slot 17 to slot 11 where it interconnects with the first lead of a fourth coil 52.

The fourth coil 52 goes from slot 11 to slot 5. The second lead 53 of the fourth coil 52 defines the end of the first exterior winding and is labeled "ext X1" in FIG. 2.

The second exterior winding starts with a fifth coil 54 having a first lead defining the first entry point labeled «ext A2». The fifth coil 54 goes from slot 47 to slot 5. The second lead 56 of the fifth coil 54 spans from slot 5 to slot 11 where it interconnects with the first lead of a sixth coil 58.

The sixth coil 58 goes from slot 11 to slot 17. The second lead 60 of the sixth coil 58 spans from slot 17 to slot 22 where it interconnects with the first lead of a seventh coil 62.

The seventh coil 62 starts the return of the second winding of phase A since the halfway point of the stator 14 has been reached. Accordingly, the seventh coil goes from slot 22 back to slot 16. The second lead 64 of the seventh coil 62 spans from slot 16 to slot 10 where it interconnects with the first lead of an eight coil 66.

The eighth coil 66 goes from slot 10 to slot 4. The second lead 67 of the eighth coil 66 defines the end of the second exterior winding and is labeled "ext X2" in FIG. 2. Accordingly, with the eight pre-wound coils, the external portion of the winding is done.

One skilled in the art will notice that lead 46 spans seven (7) slots between slot 16 and slot 23 while lead 60 spans five (5) slots between slot 17 and 22. The reason for this is known to those skilled in the art. Without going into details, these leads are different from the other in view of compensating for voltage differences by using different slots for the return portion of the windings.

The end of the first external winding labeled "ext X1" becomes the start of the first internal winding when the lead 53 is brought to slot 47 (see dashed lines). Similarly, the end of the second external winding labeled "ext X2" becomes the start of the second internal winding when the lead 67 is brought to slot 46 (see dashed lines). In some embodiments, the interconnections between the leads of external windings and internal windings are formed by way of spot welding.

For clarity purposes the first and second internal windings are not illustrated in FIG. 2. The coils forming first internal winding follow the coils forming the second external winding while the coils forming the second internal winding follow the coils forming the first external winding.

Accordingly, the first winding, which is the combination of the first external and first internal windings, has half of the coils positioned externally and half the coils positions internally. This is also true for the second winding, which is the combination of the second external and second internal windings.

This second winding is not shown in the appended drawings. One skilled in the art will understand that the second winding is a mirror image of the first winding.

Figure 3:
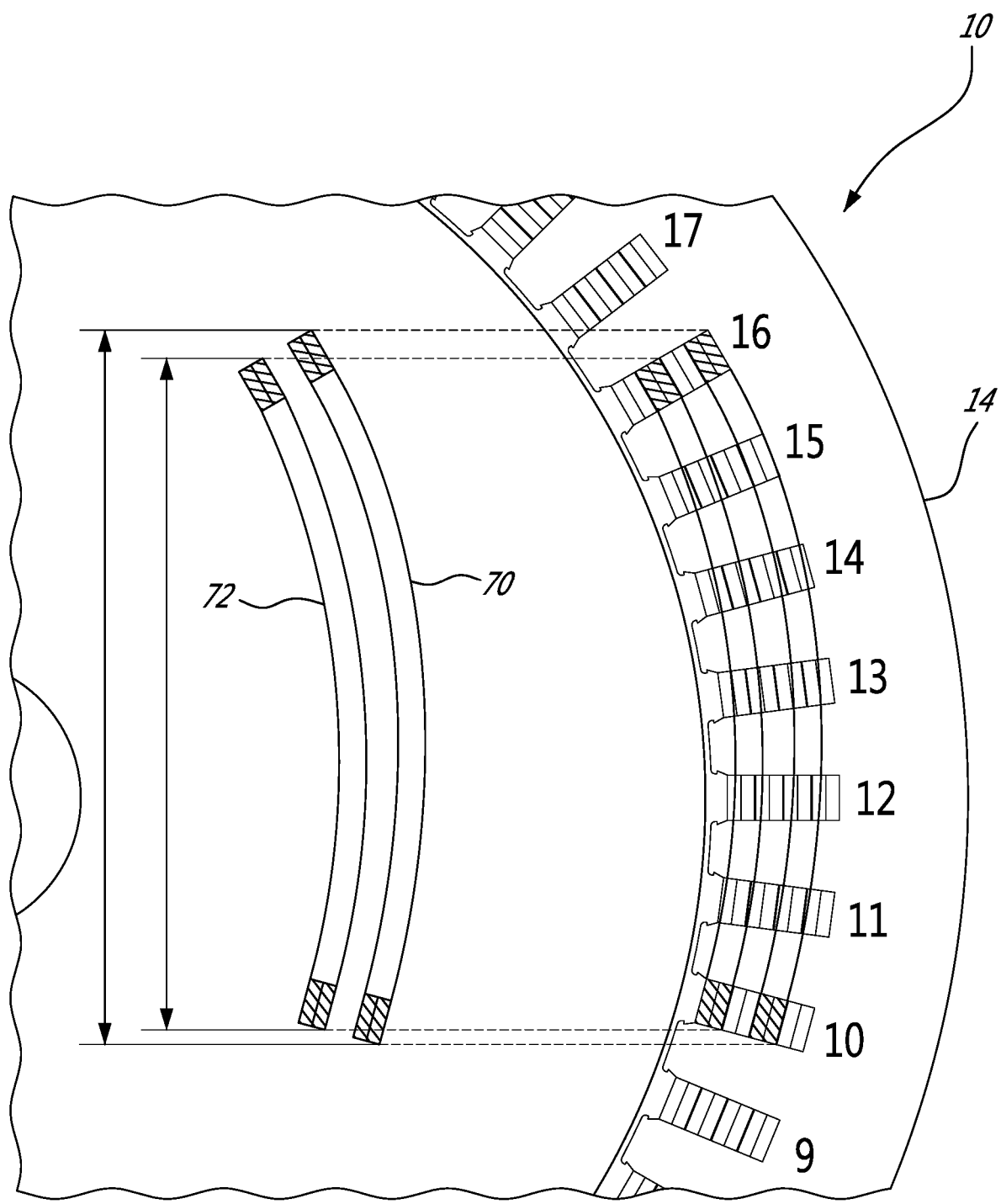
FIG. 3 is a schematic sectional view illustrating the differences between the pre-wound coils used in the internal and external layer of the stator structure.

By being closer to the rotor 12, the internal winding 24 will have a smaller circumferential length and a more compact end span than that of external winding 26. With half of the winding on the internal winding, the entire winding length may be shortened. FIG. 3 of the appended drawings illustrate the difference in size between an external coil 70 and an internal coil 72. As mentioned above, this difference in size allows an easier insertion of the coils into the slots while keeping intact the coat of insulation varnish provided on the wire forming the pre-wound coils. Moreover, the shortened winding length and reduced end span may also advantageously lead to reduced weight of the overall apparatus, shorter overhanging portions, and reduced material cost.

It is to be noted that the coils 70 and 72 are schematically illustrated in FIG. 3. Indeed, the heads of the coils are shaped differently than shown in this figure to allow the various coils of the various phases not to interfere with one another. Notwithstanding the shape of the coil heads, the position of the coil arms in the slots is as illustrated in FIG. 3.

One skilled in the art will understand that while a three-phase stator where the pre-wound coils are interleaved every sixth coil slot have been shown in the appended figures and described hereinabove, this is only for illustration purpose. The number of phases and the number of coil slots spanned by each pre-wound coil may vary.

One skilled in the art will understand that while pre-wound coils having two turns of rectangular wire are illustrated herein, the number of turns of wire could be different.

One skilled in the art may also understand that the present disclosure may also be extended to more than two layers of winding, including stators that have internal, external and one or more intermediate layers of interleaved pre-wound coils.

While the stator body has been described hereinabove as being made of a stack of laminations, other technologies, for example sintered powered material, could also be used.

While an electric machine provided with an internal rotor and an external stator is described herein and in the appended drawings, one skilled in the art that the stator structure provided with two layers of interleaved pre-wound coils could also be beneficial to an electric machine where the stator is internal and the rotor external.

It is to be understood that the stator structure with two layers of pre-wound coils is not limited in its application to the details of construction and parts illustrated in the accompanying drawings and described hereinabove. The stator structure with two layers of pre-wound coils is capable of other embodiments and of being practiced in various ways. It is also to be understood that the phraseology or terminology used herein is for the purpose of description and not limitation. Hence, although the stator structure with two layers of pre-wound coils has been described hereinabove by way of illustrative embodiments thereof, it can be modified, without departing from the scope and nature thereof.

What is claimed is:

1. A multi-phase electric machine comprising a rotor and a stator structure, the stator structure comprising:
   a generally cylindrical body including teeth defining coil-receiving slots;
   an internal and an external layer of interleaved electrically conducting coils inserted into the slots with the internal and the external layers separated by an insulating layer;
   each phase including coils provided on the internal layer of interleaved coils and coils provided on the external layer of interleaved coils.

2. The multi-phase electric machine of claim 1, wherein the coils are each rectangular wire pre-wound coils, each phase including multiple interconnected coils provided on the internal layer of interleaved coils and multiple interconnected coils provided on the external layer of interleaved layer of interleaved coils.

3. The multi-phase electric machine of claim 1, wherein half of the coils for each phase are provided on the internal layer of interleaved coils, and half of the coils for each phase are provided on the external layer of interleaved coils.

4. The multi-phase electric machine of claim 1, wherein the machine is a three-phase machine.

5. The multi-phase electric machine of claim 4, wherein each phase occupies two consecutive slots for every six slots.

6. The multi-phase electric machine of claim 1, wherein the coils in the internal layer of interleaved coils are of different size than the coils in the external layer of interleaved coils.

7. The multi-phase electric machine of claim 1, wherein a length of the coils in the internal layer of interleaved coils is shorter than a length of the coils in the external layer of interleaved coils.

8. The multi-phase electric machine of claim 1, wherein each of the coils has the same number of turns.

9. A method of inserting pre-wound coils into coil-receiving slots defined by radially extending teeth on a surface of a stator of a multi-phase machine, the method comprising:
   inserting interleaved electrically conducting coils into the slots to form an internal layer of interleaved coils;
   inserting interleaved electrically conducting coils into the slots to form an external layer of interleaved coils; and
   forming a plurality of winding phases, each winding phase including coils provided on each of the internal and the external layers of interleaved coils.

10. The method of claim 9, further comprising
   balancing voltage difference between the coils provided on the internal layer of interleaved coils and the coils provided on the external layer of interleaved coils by providing half of the coils in each of the plurality of winding phases from the internal layer of interleaved coils and providing another half of the coils in each of the plurality of winding phases from the external layer of interleaved coils.

11. The method of claim 9, further comprising
   forming the internal layer of interleaved coils with coils of a first size; and
   forming the external layer of interleaved coils with coils of a second size
   wherein the first size is smaller than the second size.

* * * * *